(12) United States Patent
Barbe

(10) Patent No.: US 7,314,553 B1
(45) Date of Patent: Jan. 1, 2008

(54) POOL FILTER CLEANING DEVICE

(76) Inventor: Andre Christian Barbe, 13640 Sycamore Dr., Morgan Hill, CA (US) 95037

( * ) Notice: Subject to any disclaimer, the term of this patent is extended or adjusted under 35 U.S.C. 154(b) by 256 days.

(21) Appl. No.: 11/072,891

(22) Filed: Mar. 4, 2005

(51) Int. Cl.
*B03B 3/14* (2006.01)
*B01D 29/27* (2006.01)
*B01D 29/31* (2006.01)

(52) U.S. Cl. .................. 210/232; 210/315; 210/448; 210/484; 134/110

(58) Field of Classification Search ............ 210/232, 210/314, 315, 448, 464, 484; 134/110; 220/666
See application file for complete search history.

(56) References Cited

U.S. PATENT DOCUMENTS

| | | | |
|---|---|---|---|
| 811,754 A * | 2/1906 | West ...................... 210/315 |
| 1,583,083 A | 5/1926 | Macaraig | |
| 3,014,516 A | 12/1961 | Mueller | |
| 4,320,630 A * | 3/1982 | Uselton et al. ............ 62/238.6 |
| 4,505,823 A * | 3/1985 | Klein ...................... 210/668 |
| 5,202,020 A * | 4/1993 | Desjoyaux et al. ........ 210/446 |
| 5,330,065 A | 7/1994 | Bradley | |
| 5,384,045 A | 1/1995 | Chmielewski | |
| 5,417,855 A * | 5/1995 | Gershenson ............... 210/315 |
| 5,960,983 A | 10/1999 | Chan | |
| 6,051,138 A * | 4/2000 | Hobson, Jr. ............. 210/323.2 |
| 6,089,394 A | 7/2000 | Ziglar | |
| 6,103,116 A * | 8/2000 | Koslow et al. ............ 210/282 |
| 6,463,943 B1 | 10/2002 | Monroe | |
| 6,497,814 B1 | 12/2002 | Alexander | |
| 6,520,365 B2 | 2/2003 | Schneider | |
| 2003/0201222 A1* | 10/2003 | Malkin ..................... 210/485 |
| 2004/0104163 A1* | 6/2004 | Leaverton ................. 210/448 |

* cited by examiner

*Primary Examiner*—Fred G. Prince

(57) ABSTRACT

A pool filter cleaning device comprising a containment chamber having a upper end, a lower end, and a circumferential sidewall. The sidewall has a water deflecting portion adjacent the upper end and the containment chamber is adapted to receive a dirty pool filter. A contaminant trap is provided that is releasably secured to the sidewall for capturing contaminants of the pool filter when the filter is sprayed with water. The contaminant trap can be removed from the sidewall for disposal into a trash receptacle. The cleaning device can be configured to have a expanded and collapsed configuration for easy transportation or storage.

19 Claims, 9 Drawing Sheets

POOL FILTER CLEANING DEVICE

FIELD OF THE INVENTION

The invention relates in general to servicing reusable filters used in aqueous tank filtration systems. More specifically, the invention relates to a pool filter cleaning device that captures contaminants and diatomaceous earth present on a dirty pool filter in a manner allowing for proper disposal of these elements once the filter has been cleaned.

BACKGROUND OF THE INVENTION

Swimming pool filters need to be removed and cleaned approximately 2-3 times a year. These filters are normally removed and cleaned on site utilizing a garden hose spraying water throughout all the panel elements of the filter. This process utilizes a significant amount of water which spreads throughout the work area, taking along with it the contaminants present on the filter. Depending on the site, the water and contaminants are typically dispersed into nearby landscaping, drainage systems, and sewer systems.

A significant number of pool filters utilize diatomaceous earth that adheres to the surface of the filter in order to increase the ability of the filter to capture small contaminants. Diatomaceous earth is a heavy, dense, fine white powder, which, when cleaning the filter, leaves a white residue around the area where the filter is serviced. In addition, diatomaceous earth clings to drainage systems and over time can clog these systems. Recently many counties in the state of California and other states have passed ordinances making it illegal to wash diatomaceous earth into street sewer systems. These ordinances often provide fines for each instance such dumping is cited. Presently, the most common method used to prevent the diatomaceous earth from entering street sewer systems is to clean the filters in landscape areas. However, diatomaceous earth residue can undesirably build up in landscape areas, making this method aesthetically undesirable. Thus, there is a need to provide a pool filter cleaning device that prevents dispersing diatomaceous earth and other contaminants into the environment.

BRIEF SUMMARY OF THE INVENTION

The present invention provides its benefits across a broad spectrum of servicing reusable filters used in aqueous tank filtration systems. Although the present invention is discussed in conjunction with cleaning diatomaceous earth pool filters, it may be used for cleaning any reusable filter. While the description which follows hereinafter is meant to be representative of such applications, it is not exhaustive. As will be understood, the basic apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a pool filter cleaning device that traps contaminants present on the filter and prevents the contaminants from being dispersed in the area where the filter is serviced.

It is another aspect of the present invention to provide a pool filter cleaning device that traps diatomaceous earth present on the filter and prevents its residue from being dispersed in the area where the filter is serviced.

It is still yet another aspect of the present invention to provide an easy and effective way to dispose contaminants and diatomaceous earth that has been removed from a dirty pool filter.

It is a feature of the present invention that a removable disposable contaminant trap is provided in the pool filter cleaning device that can be removed from the device once it is full of contaminants and diatomaceous earth.

It is another feature of the present invention that the pool filter cleaning device has an expanded and collapsed configuration.

It is still another feature of the present invention that the pool filter cleaning device can be secured in a collapsed configuration when it is not in use.

It is an advantage of the present invention that diatomaceous earth pool filters can be easily cleaned while simultaneously preventing diatomaceous earth from clogging sewer and drainage systems.

It is another advantage of the present invention that the pool filter cleaning device can be secured in the collapsed configuration for efficient transportation or storage.

These and other aspects, features, and advantages are achieved/attained in the apparatus of the present invention that comprises a containment chamber having a upper end, a lower end, and a circumferential sidewall extending between the upper end and the lower end. The containment chamber is adapted to receive a pool filter from its upper end. The sidewall has a water deflecting portion adjacent the upper end so that water and contaminants travel downward toward the lower end. A contaminant trap is provided in communication with the sidewall for capturing contaminants from the pool filter as the water and contaminants travel downward. The trap is sufficiently porous to allow water to pass through while substantially preventing diatomaceous earth from passing through. In a number of embodiments the sidewall has a porous portion adjacent the lower end that allows water to pass freely out of the containment chamber.

The trap is releasably secured to the sidewall so that it can be easily removed from the apparatus. The trap is disposable so that contaminants and diatomaceous earth caught in the trap can be easily and properly disposed of in a trash bin. A new trap can then be attached to the sidewall for to the next time the filter is serviced. Preferably a water deflecting flap is attached to the water deflecting portion of the sidewall extending downward and overlapping the trap where it is releasably secured to the sidewall. The water deflecting flap prevents contaminants from collecting at the releasable connection between the trap and sidewall.

In a number of embodiments the cleaning device has a collapsed and expanded configuration. In these embodiments the sidewall is made from a flexible material to allow the device to transition between the two configurations. In the expanded configuration the device is adapted to receive a dirty pool filter for cleaning. The device can then be stored in the collapsed configuration when the device is not in use. In one embodiment a coil spring is in communication with the sidewall biasing the containment chamber in the expanded configuration. In another embodiment a plurality of flexible ribs are used to bias the containment chamber in the expanded configuration. In yet another embodiment the containment chamber forms a bellows which biases the chamber in the expanded configuration.

In other embodiments the cleaning device does not have an expanded and collapsed configuration. In one embodiment, the containment chamber is a substantially resilient, self-supportive, canister structure having a plurality of holes near its lower end to allow water to pass freely out of the chamber. In another embodiment a substantially resilient, self-supportive, canister structure is used to provide support for device. In this embodiment the water deflecting flap is affixed to an upper rim that removably engages the upper end of the containment chamber, so that the upper rim, flap, and trap can be removed from the canister. The canister can then be used for other pool servicing purposes not involving filter servicing, such as, a place to dump leaves and other debri accumulated in pool strainer baskets or skimmed from the surface of bottom of the pool.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements or features common to the figures.

DETAILED DESCRIPTION OF THE PREFERRED EMBODIMENTS

Figure 1:
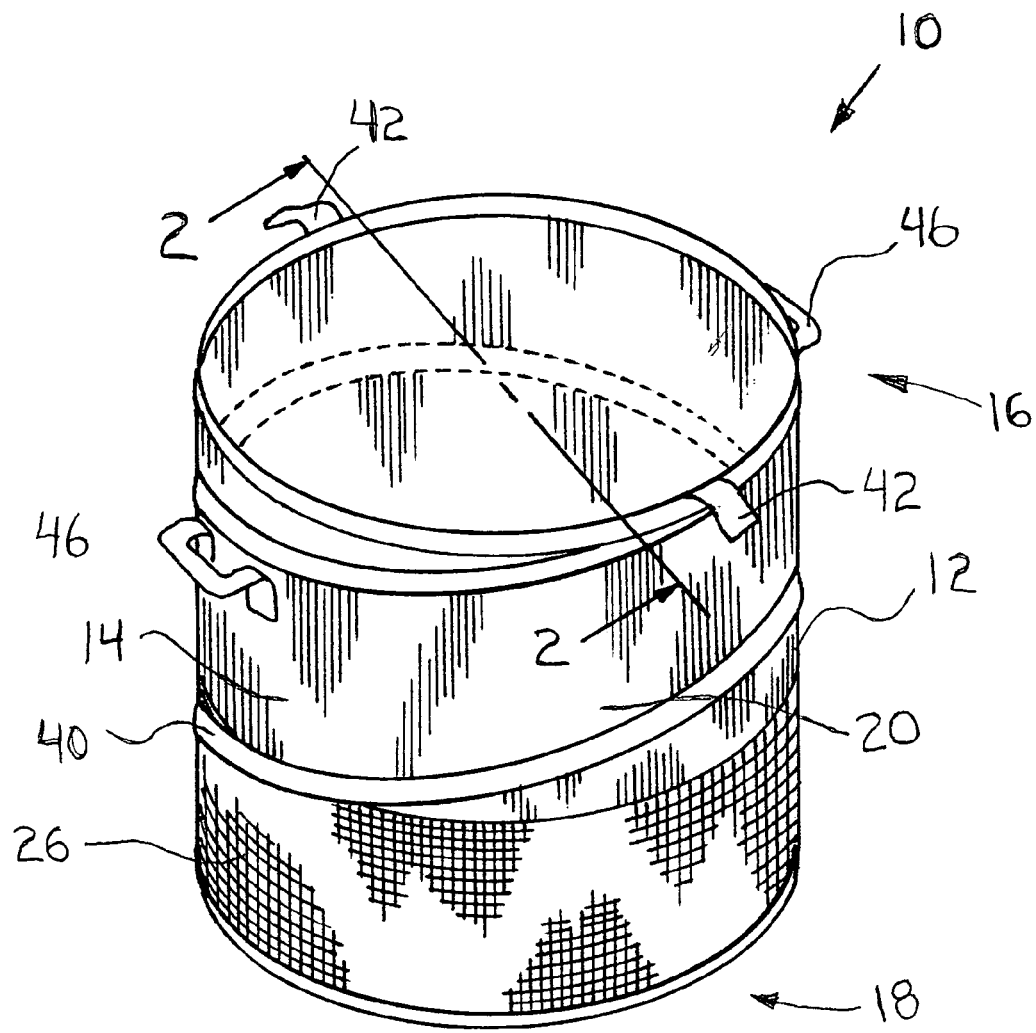
FIG. 1 is a perspective view of an embodiment of the present invention pool filter cleaning device.
Figure 2:
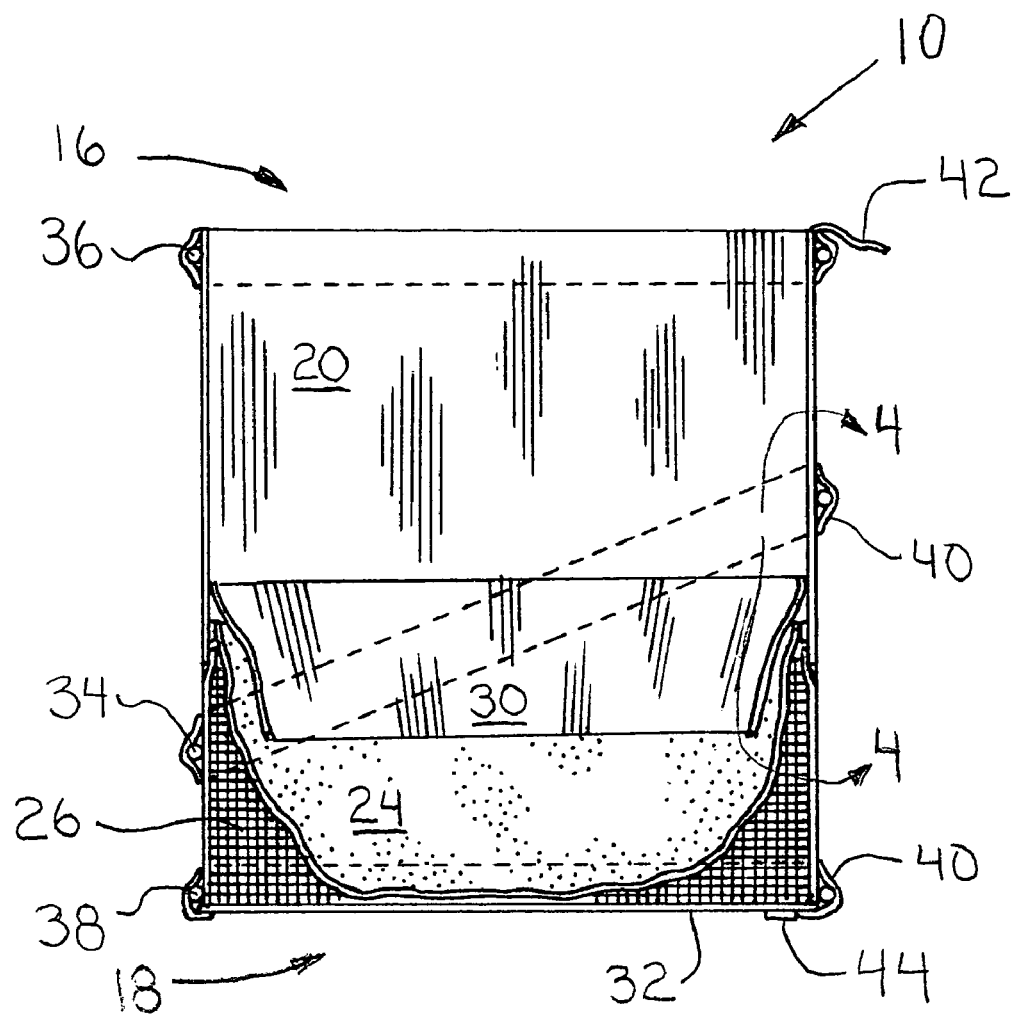
FIG. 2 is a cross-sectional view of the embodiment of the pool filter cleaning device of FIG. 1 taken along the line 2-2 in FIG. 1.
Figure 3:
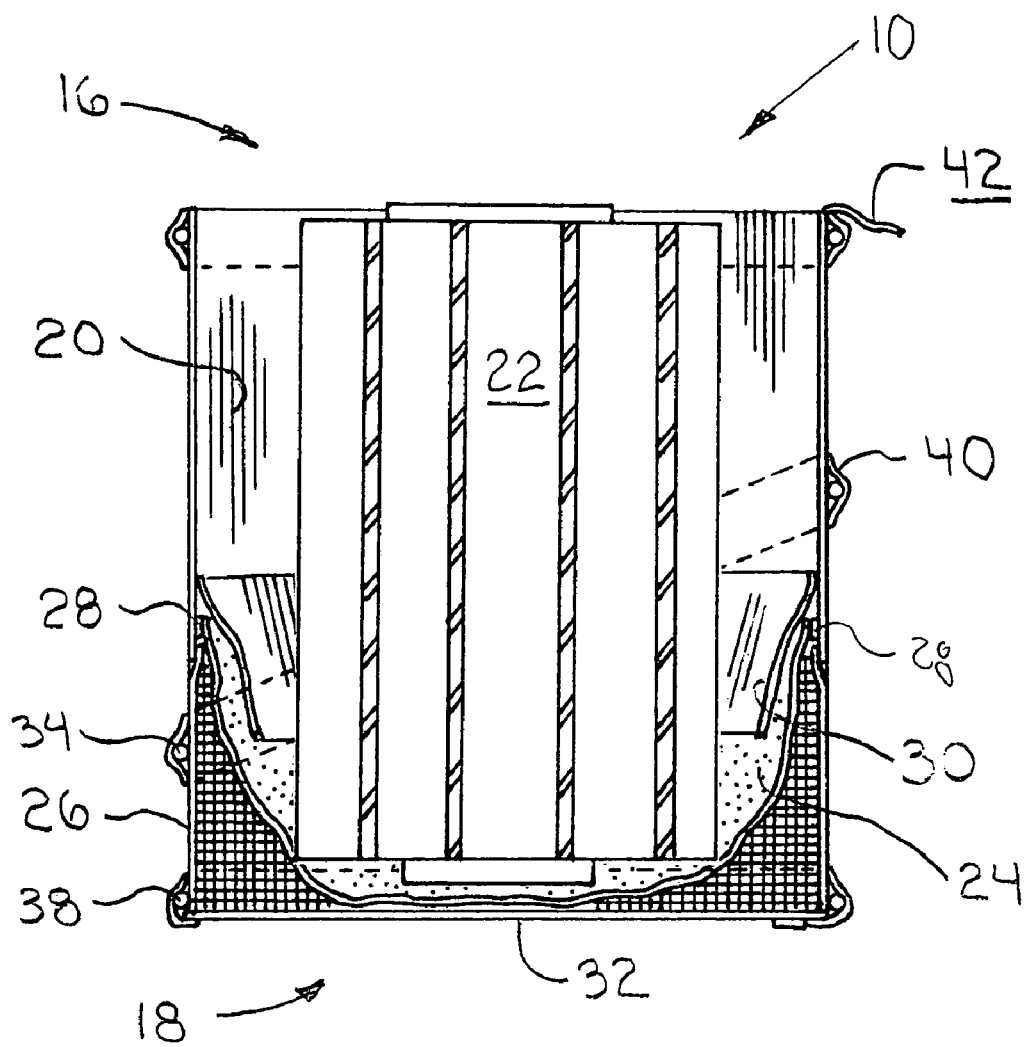
FIG. 3 is another cross-sectional view of the pool filter cleaning device of FIG. 1 taken along the line 2-2 in FIG. 1.

Referring to FIGS. 1-5, a pool filter cleaning device is shown generally by number 10 in accordance with a first embodiment of the present invention. The pool filter cleaning device 10 comprises a containment chamber 12 having a circumferential sidewall 14 extending between an upper end, generally shown by numeral 16, and a lower end, generally shown by numeral 18. The sidewall 14 has a water deflecting portion 20 adjacent the upper end 16, and the containment chamber 12 is open at the upper end 16 for receiving a dirty pool filter 22, as shown in FIG. 3.

Referring to FIGS. 2 and 3, a contaminant trap 24 is shown in communication with the sidewall 14 for capturing the contaminants of the pool filter 22 when water is delivered into the upper end 16 of the cleaning device 10 to clean the pool filter. The contaminant trap 24 is formed from a porous material that is sufficiently porous to allow water to pass through while substantially preventing diatomaceous earth from passing through. Significantly, diatomaceous earth, which is used in many pool filters to improve the filters ability to capture contaminants in a pool, is captured by the contaminant trap 24 and prevented from being dispersed in the vicinity where the pool filter is being cleaned. The contaminant trap 24 prevents the diatomaceous earth from not only being spread over deck surfaces and landscaping, but also prevents it from being delivered into sewer or drainage systems.

Referring to FIG. 3, when water that is sprayed through the upper end 16 of the cleaning device 10 to clean the pool filter 22, the water passes through the trap 24 and out of the containment chamber 12 through a porous portion 26 of the sidewall 14 that is adjacent the water deflecting portion 20 of the sidewall. In this embodiment, the contaminant trap 24 is in communication with the water deflecting portion 20 of the sidewall in a releasably secured manner by hook and loop fasteners 28, such as with VELCRO® brand hook and loop fasteners. However, the contaminant trap 24 can be releasably secured to the sidewall 14 by any number of means known to those skilled in the art, such as with buttons, snap fittings, zippers, or the like. Because the contaminant trap 24 is releasably secured to the sidewall 14, it can be removed from the cleaning device and properly disposed of in a waste receptacle when full of contaminants and diatomaceous earth. Advantageously, the vicinity where the filter is cleaned remains substantially free of contaminants and diatomaceous earth residue.

Figure 4:
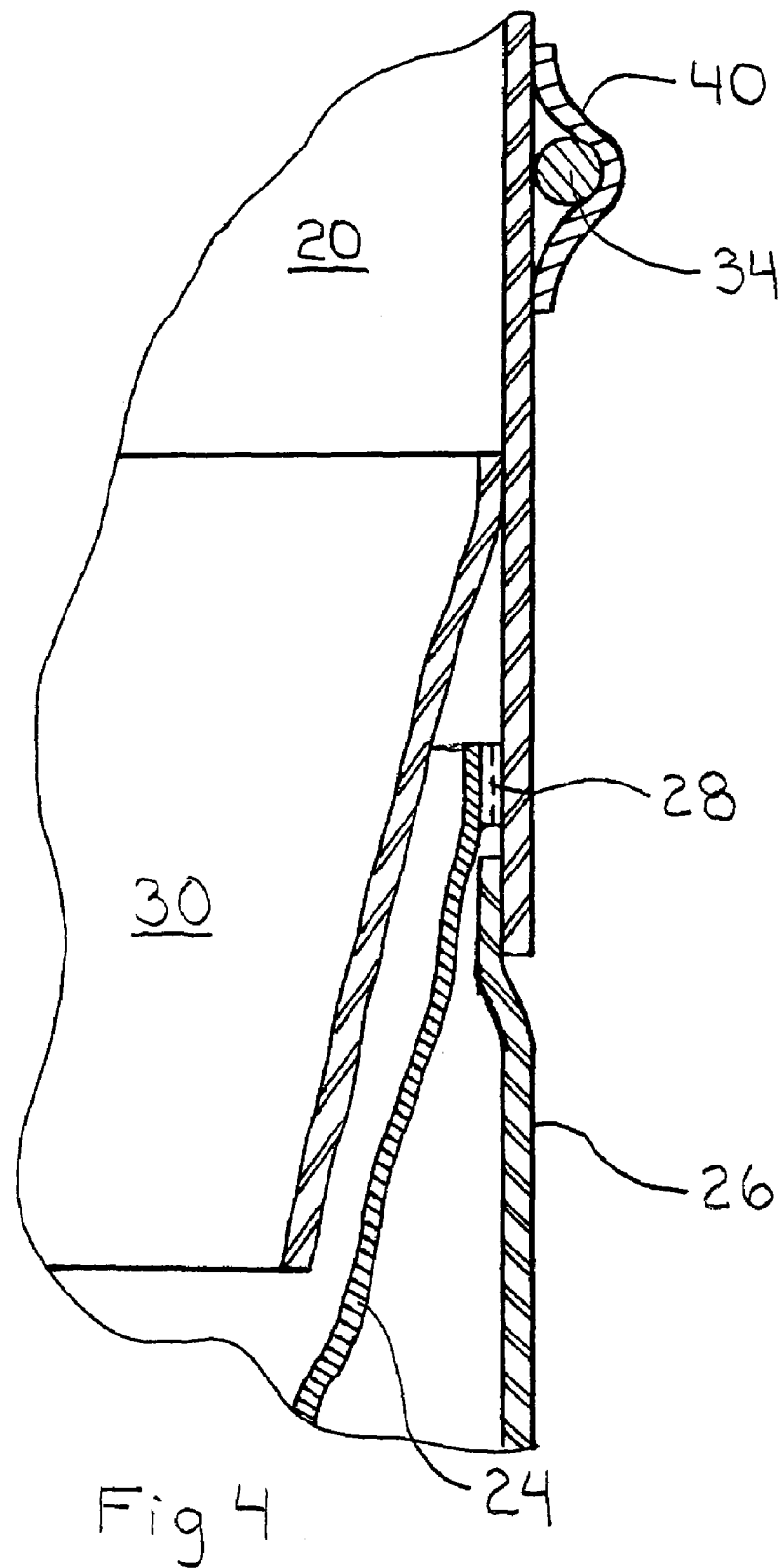
FIG. 4 is an enlarged cross-sectional view of the pool filter cleaning device of FIG. 1 taken along the line 4-4 in FIG. 2.

Referring particularly to FIGS. 2-4, a water deflecting flap 30 is secured to the water deflecting portion 20 of the sidewall 14. The water deflecting flap 30 extends generally downward toward the lower end 18 of the containment chamber 12 and overlaps the trap 24 where the trap is in communication with the sidewall. This flap 30, which can be secured by stitching, adhesives, or any other means well known in the art, acts to deflect water and contaminants from collecting around the hook and loop fasteners 28 so that the securing feature of the fasteners does not degrade over time. Further, a bottom shell 32 is provided in communication with the sidewall 14 enclosing the containment chamber 12. The bottom shell 32 is sufficiently porous to allow water to pass through as is the porous portion 26 of the sidewall. Alternatively, the bottom shell may be non-porous or omitted so as to leave the containment chamber 12 open at the lower end 18, if desired.

The embodiment of the pool filter cleaning device 10 shown in FIGS. 1-4 has a expanded and collapsed configuration, and is shown in the expanded configuration. In this embodiment, a coil spring 34 is provided that is in communication with the sidewall 14 which biases the containment chamber 12 in the expanded configuration. The coil spring 34 has a top coil 36 adjacent the upper end 16 and a bottom coil 38 adjacent the lower end 18 of the containment chamber 12. A strip of flexible material 40 secures the coil spring 34 to the containment chamber by stitches. However, any other attachment means well known to those skilled in the art may be used to secure the coil spring to the containment chamber, such as with fastening loops, adhesives, or the like. Securing straps 42 are provided in communication with the upper end 16 of the containment chamber 12 for attachment to the lower end 18 of the containment chamber to hold the cleaning device 10 in the collapsed configuration. Any fastening device as is well known in the art may be used, and in this embodiment a fastening patch 44 is provided on the bottom shell 32 to attach to the securing strap 42 via hook and loop fasteners. Thus, the pool filter cleaning device 10 may be secured in the collapsed configuration when not in use, which is very advantageous for pool service companies whose service vehicles often have limited space for additional bulky equipment. The pool filter cleaning device 10 shown in FIGS. 1-3 is also provided with two handles, identified by numeral 46, to assist handling the cleaning device in either the expanded or collapsed configuration.

The construction of the collapsible pool filter cleaning device 10 shown in FIGS. 1-3 is similar to that of collapsible containers designed for use around the house, which are well known. However the pool filter cleaning device 10 does not need a durable bottom shell, as disclosed in U.S. Pat. No. 6,520,365, since it is not intended to be used to lift heavy objects. In fact, the pool filter cleaning device 10 need not have a bottom shell at all, as its lower end 18 can be open and still perform the function of cleaning pool filters.

Figure 5:
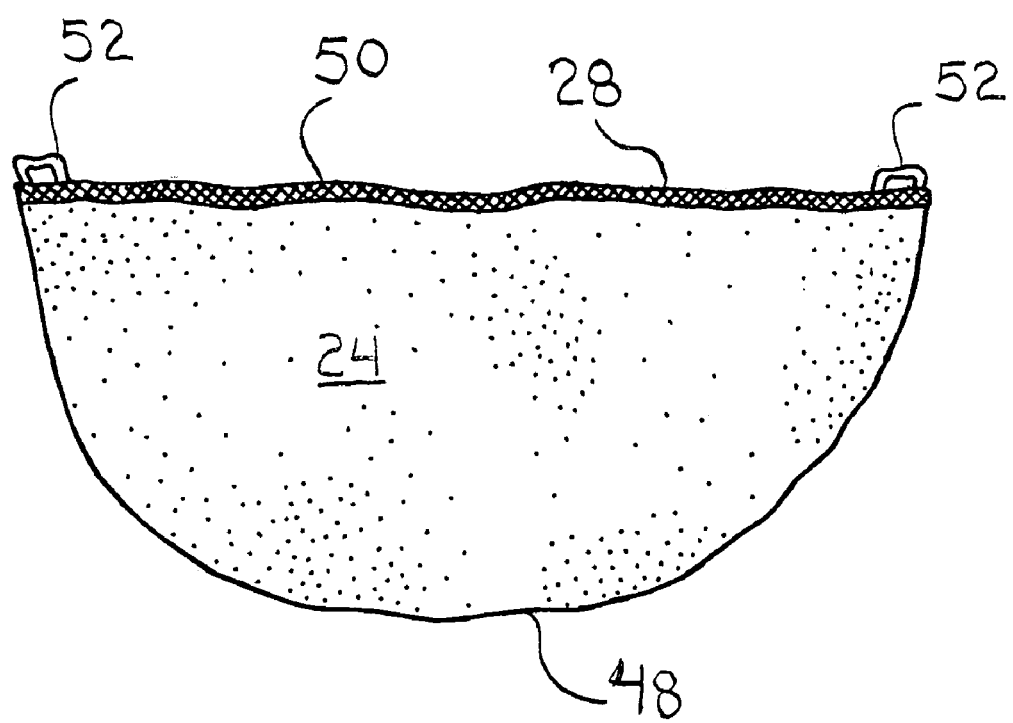
FIG. 5 is a side view of the contaminant trap of the pool filter cleaning device of FIG. 1

FIG. 5 shows the contaminant trap 24 removed from the cleaning device 10. The trap 24 is formed from a flexible porous material that substantially prevents diatomaceous earth from passing through the trap. It has been found that a cotton cloth fabric works well in capturing diatomaceous earth, however other materials may be used, if desired, such as silk or synthetic fabrics. Any flexible porous material can be used as long as it allows water to pass through while substantially preventing diatomaceous earth from passing through. In the embodiment shown in FIGS. 1-4, the contaminant trap 24 is formed from two half circles of cotton cloth fabric sewn together along their arc circumference 48 with a hook and loop fastener strap 28 being sewn into the top portion 50. A mating hook and loop fastener strap 28 is attached to the circumferential sidewall 14 providing the releasably secured relationship between the contaminant trap 24 and sidewall 14. For convenience, handle straps 52 are also sewn into the top portion 50 to provide ease in removing the trap 24 from the cleaning device 10 when it is ready for disposal.

Tests were preformed to determine the efficiency of the cotton cloth contaminant trap for capturing diatomaceous earth particles. The first test was to determine the percentage volume of particle sizes present in a sample of diatomaceous earth commercially sold in pool supply centers. The results of the test are shown in Table 1.

TABLE 1

| Particle diameter size range (μm) | Percentage by Volume of particles within the size range |
|---|---|
| 100 μm-70.0 μm | 7.25% |
| 70 μm-50 μm | 21.91% |
| 50 μm-40 μm | 19.68% |
| 40 μm-30 μm | 28.70% |
| 30 μm-20 μm | 19.98% |
| 20 μm-15 μm | 1.94% |
| 15 μm-2.0 μm | 0.54% |

The results in Table 1 demonstrate that about 90% by volume of diatomaceous earth used in pool filter applications have a particle diameter size range of between about 20 μm and 70 μm. Next, a filtration test was conducted to determine the efficiency of the cotton cloth fabric in capturing particle diameter size ranges between 2.0 μm to 100 μm. Particles within the various ranges were delivered in water to the cotton cloth material in a clean and un-used condition, and the concentration of particles upstream of the material (filter) and downstream of the filter were measured. Efficiency for each particle range was determined by the following formula:

$$F_{eff} = (C_{up} - C_{down}) \div C_{up} \times 100\%$$

where:
$F_{eff}$=Efficiency
$C_{up}$=Particle Concentration Upstream of Filter
$C_{down}$=Particle Concentration Upstream of Filter The results of the filtration efficiency test are shown in Table 2.

TABLE 2

| Particle size range | Efficiency $F_{eff}$ |
|---|---|
| 2.0 μm-5.0 μm | 3.9% |
| 5.0 μm-10.0 μm | 14.4% |
| 10.0 μm-20.0 μm | 30.2% |
| 20.0 μm-30.0 μm | 47.3% |
| 30.0 μm-40.0 μm | 75.7% |
| 40.0 μm-60.0 μm | 86.1% |
| 60.0 μm-80.0 μm | 95.0% |
| 80.0 μm-100 μm | 98.9% |

It should be noted that these efficiency measurements were taken with a clean, un-used cloth material. When in actual use, as the material traps more diatomaceous earth, the efficiency of the material increases as the particles start to saturate the pores of the cloth. Since about 90% of the particles are of a size range between 20 μm and 70 μm, and the measured efficiencies for a clean cloth within the particle range between about 30.2% and 90%, the average efficiency within this range is about 60% ((30%+90%)/2). Hence, it is believed that any material for the contaminant trap will be effective in substantially preventing diatomaceous earth from passing through the trap if it can trap particles between a size range of about 30.0 μm and about 40.0 μm with an efficiency of at least about 60% in a clean un-used condition.

In the embodiment shown in FIGS. 1-4, the water deflecting portion 20 and porous portion 26 of the sidewall is formed from a flexible material. The primary characteristic of the materials selected for these portions is that they be flexible enough to permit repeated closings and openings without incurring appreciable deterioration. Preferably the material should be resistant to chlorine as well as UVA and UVB radiation. The flexible material may be fabricated from a fabric or from a non-fibrous PVC, urethane, nylon or other synthetic material. As used herein, the term "fabric" means any material that is knit, braided, woven, or netted with any fiber. Agricultural fibers such as cotton, animal fibers such as wool, or synthetic or man-made fibers such as cellulose may be used individually or in combination. An additional characteristic of the material comprising the water deflecting portion 20 of the sidewall 14 is that when sprayed directly with water, it substantially deflect the trajectory of the water contacting the material and substantially prevent any water passing through the material from exiting the material with a free trajectory. Preferably the material selected for the water deflecting portion 20 is water proof, although not required. It has been found that sheet Polypropylene works well for the water deflecting portion 20 of the sidewall. For the porous portion 26 of the sidewall 14, the primary characteristic of the material is that it be sufficiently porous to allow water to pass through relatively freely so that, with the contaminant trap 24 removed, the rate at which water passes through the porous portion 26 at least equals the rate at which water is typically delivered into the cleaning device 10 to clean a pool filter. In the embodiment shown in FIGS. 1-4, a polypropylene mesh having a plurality of openings of approximately 0.25 inch square has proven to satisfy this characteristic. The securing strap 42, strip of flexible material 40, and handles 46 in this embodiment are made from nylon fabric, however, any suitable material known to those skilled in the art may be used.

Figure 6:
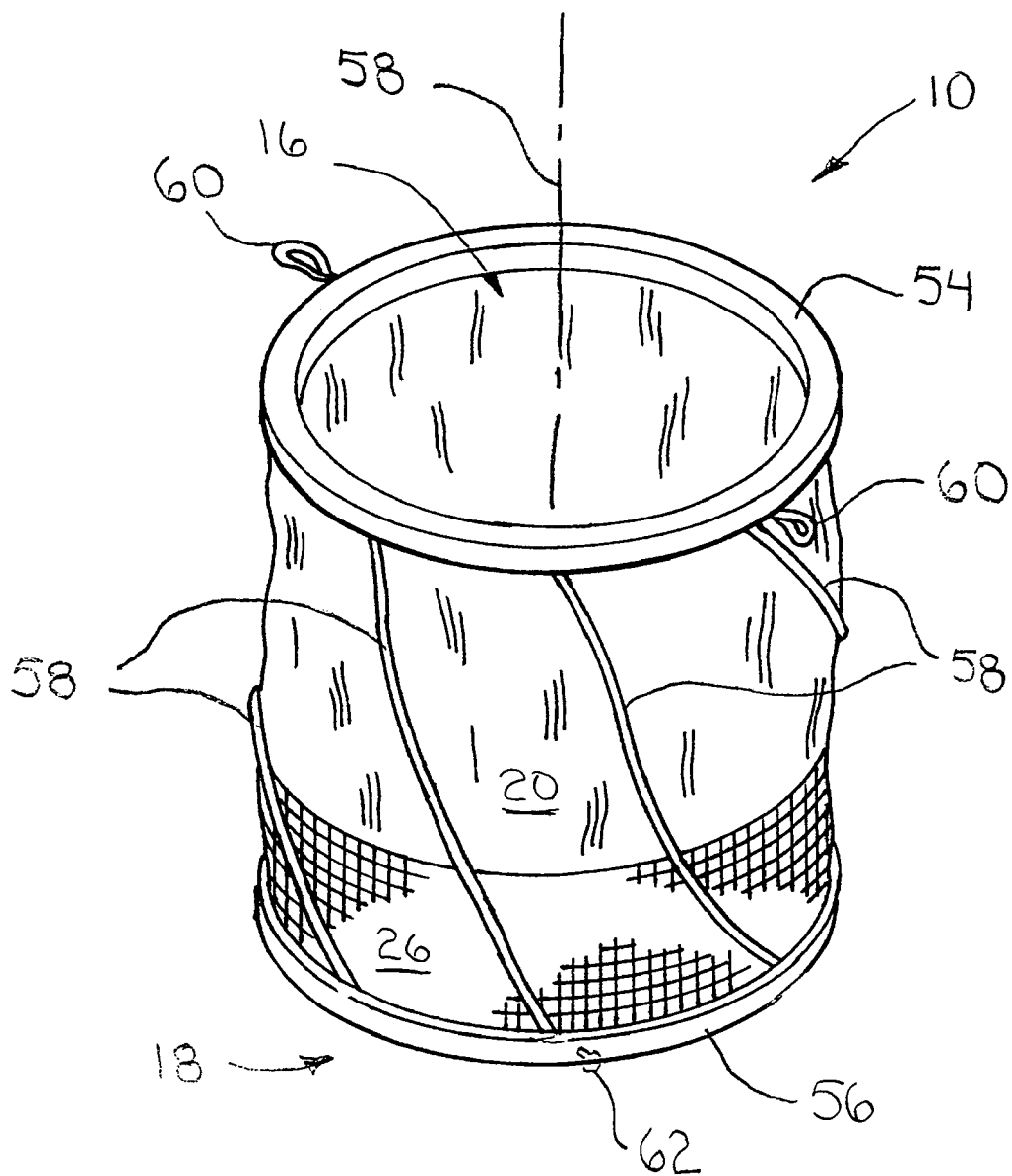
FIG. 6 is a perspective view of another embodiment of the present invention pool filter cleaning device.

Referring now to FIG. 6, an alternative embodiment of the pool filter cleaning device 10 is shown. The water deflecting portion 20 and porous portion 26 of the circumferential sidewall 12 are the same as in the embodiment in FIGS. 1-4, as well as the water deflecting flap 30. Both utilize the same contaminant trap 24 shown in FIG. 5. In this embodiment, an upper rim 54 is provided that is in communication with the upper end 16 of the containment chamber 12 and a lower rim 56 in communication with the lower end 18 of the containment chamber 12. Both the upper rim 54 and lower rim 56 do not enclose the upper and lower ends of the containment chamber 12 since the cleaning device 10 is not intended to lift heavy objects. The upper rim 54 and lower rim 56 may be formed from any substantially rigid material as is well known in the art, such as metal, plastic, wood, or the like. The upper rim 54 holds the upper end 16 of the containment chamber 12 in a desired shape while the lower rim 56 holds the lower end 18 of the containment chamber 12 in another desired shape. The upper rim 54 and lower rim 56 are shown holding the upper end 16 and lower end 18 in a circular shape, however any other shape may be selected. Further, it is not necessary that the upper rim 54 or lower rim 56 hold their respective ends in the same shape. The circular shape shown is preferred since most pool filters are cylindrical in shape and can therefore be evenly positioned between the circumferential sidewall 14 of the cleaning device 10.

The embodiment shown in FIG. 6 has a collapsible and expanded configuration which is achieved by a plurality of flexible ribs 58 in communication with the upper rim 54 and lower rim 56. Preferably the flexible ribs 58 are equally spaced about the circumferential sidewall 12 and are configured to bias the cleaning device in the expanded configuration. The flexible ribs 58 may be formed from any resilient flexible material as is well known in the art, such as, for example, spring steel, plastic, or composite carbon fiber. The flexible ribs 58 and may be attached together with an upper and lower steel ring (not shown) to form a collapsible body which is biased in the expanded configuration, with the upper and lower steel rings replacing the upper rim 54 and lower rim 56 shown in FIG. 6. The flexible ribs are similar in construction to the collapsible springy receptacle body disclosed in U.S. Pat. No. 5,960,983. In this embodiment, the upper rim 54 and lower rim 56 rotate respectively about the central axis 58 as the cleaning device 10 transitions between the expanded and collapsed configuration. To hold the cleaning device 10 in the collapsed configuration, two loop straps 60 are provided on the upper rim 54 that engage respective lugs 62 provided on the lower rim 56 which is an alternative means to secure the cleaning device in the collapsed configuration than the hook and loop securing strap 42 and fastening patch 44 shown in the embodiment of FIG. 1.

Figure 7:
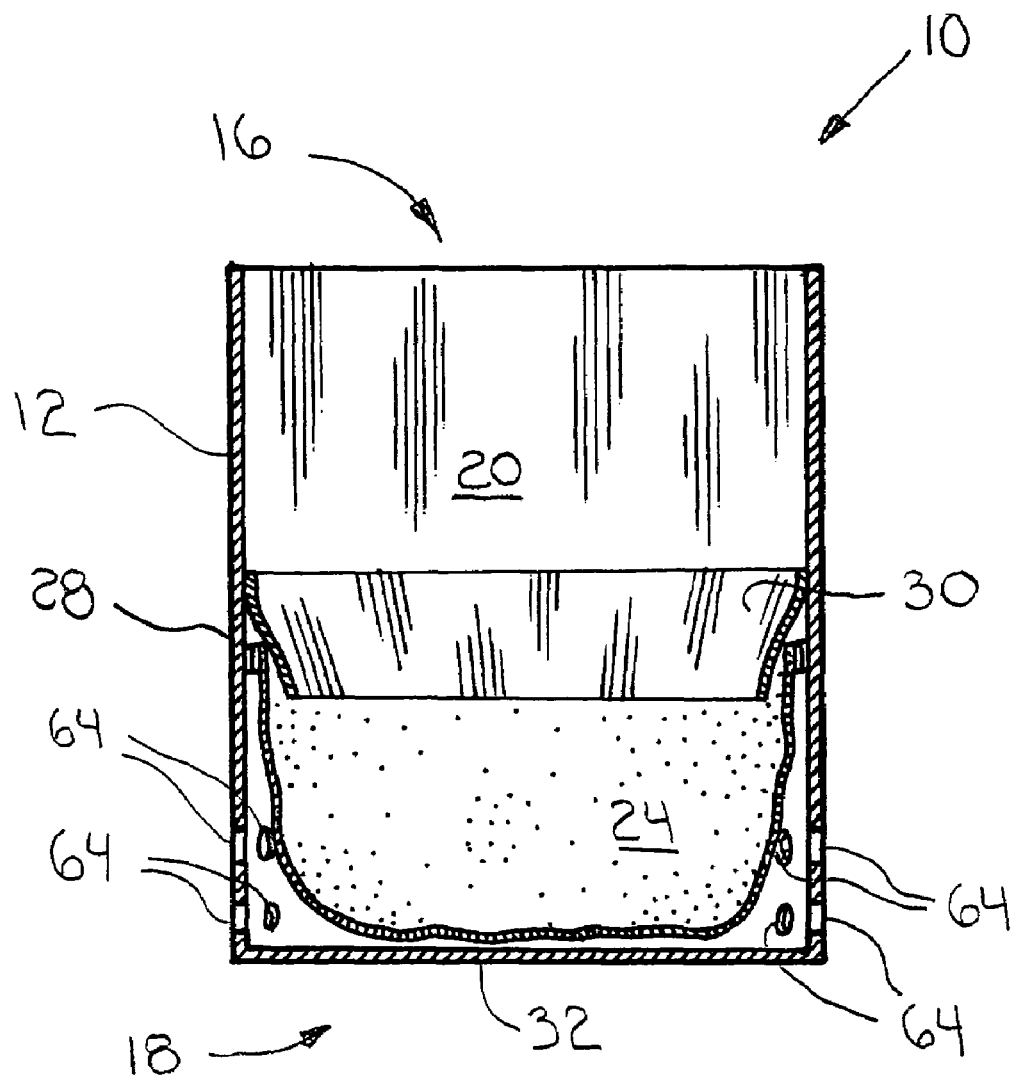
FIG. 7 is a cross-sectional view of another embodiment of the present invention pool filter cleaning device.

Another alternative embodiment of the present invention pool filter cleaning device 10 is shown in FIG. 7. This embodiment also uses the same contaminant trap 24 and water deflecting strap 30 as in the two previous embodiments discussed above. However, in this embodiment the pool filter cleaning device does not have a collapsed configuration. Instead, the containment chamber 12 is a substantially resilient, self-supportive, canister structure formed from a durable material such as polyvinylchloride, ABS plastic, or the like. The porous portion 26 of the circumferential sidewall 14 is formed by providing a plurality of holes 64 in the sidewall 14 around the lower end 18. Holes may also be provided in the bottom shell 32, if desired, although not shown. Further, the bottom shell 32 could be eliminated, if desired. The water deflecting flap 30 is fastened to the sidewall by any appropriate means known to those skilled in the art such as, for example, by the use of rivets, adhesives, stitches, or the like.

Figure 8:
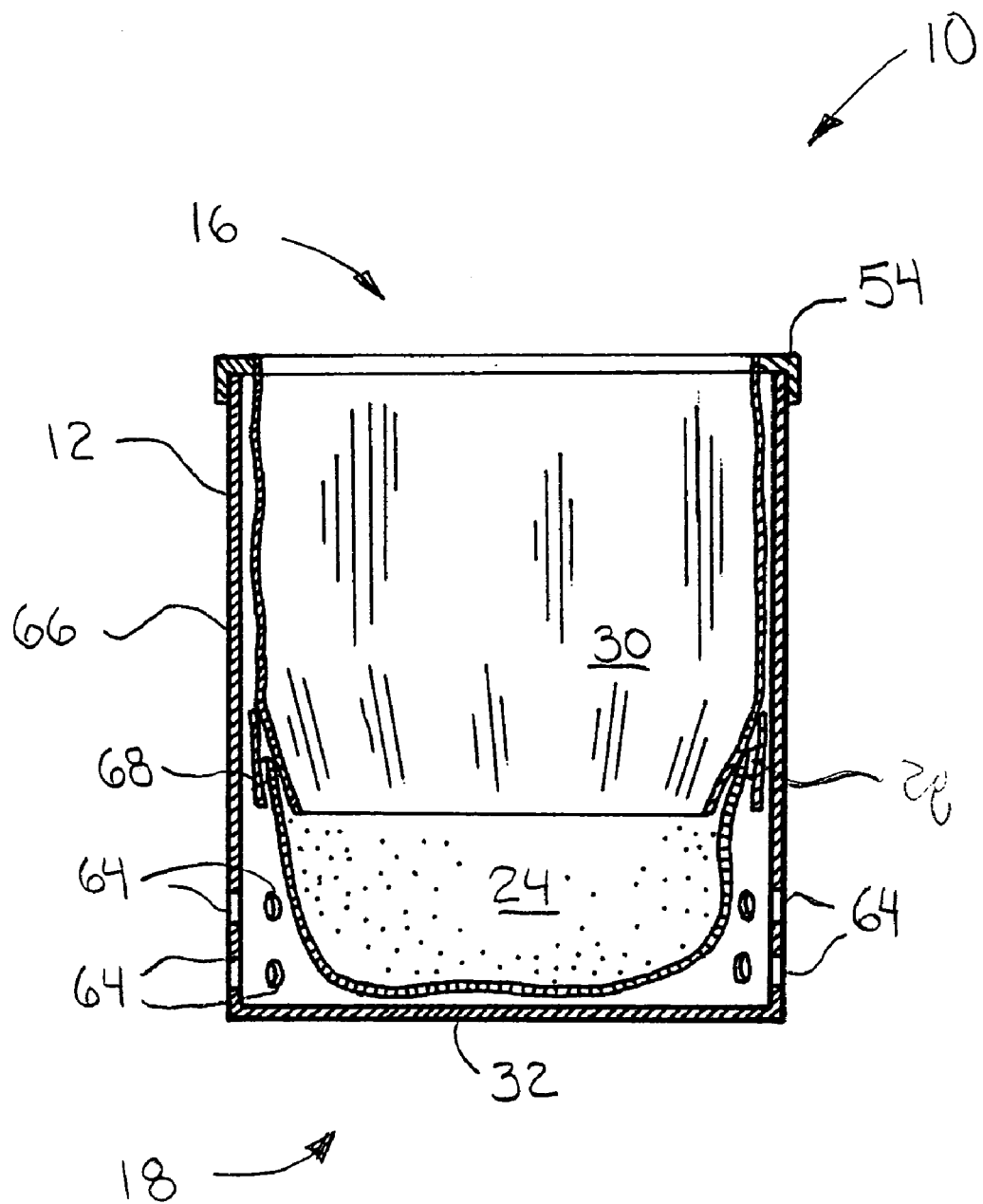
FIG. 8 is a cross-sectional view of yet another embodiment of the present invention pool filter cleaning device.

Another alternative embodiment of the pool filter cleaning device 10 is shown in FIG. 8. This embodiment is similar to that shown in FIG. 7 in that it also utilizes a substantially resilient, self-supportive, canister structure 66 having a plurality of holes 64 to allow water to pass through the pool cleaning device 10. However, the water deflecting flap 30 is affixed to an upper rim 54 that removably engages the upper end 16 of the containment chamber 12. An additional flap 68 having a hook and loop fastener 28 for securing the contaminant trap 24 is secured to the water deflecting flap 30. In this embodiment the upper rim 54, water deflecting flap 30, additional flap 68, and contaminant trap 24 can be removed in unison by lifting the upper rim 54 from the containment chamber. This allows easier access to remove the contaminant trap 24 than the embodiment shown in FIG. 7. Further, the canister structure 66 can be used separately to collect wet leaves and other objects that are often skimmed from out of the pool when pool filter cleaning is not needed.

Figure 9:
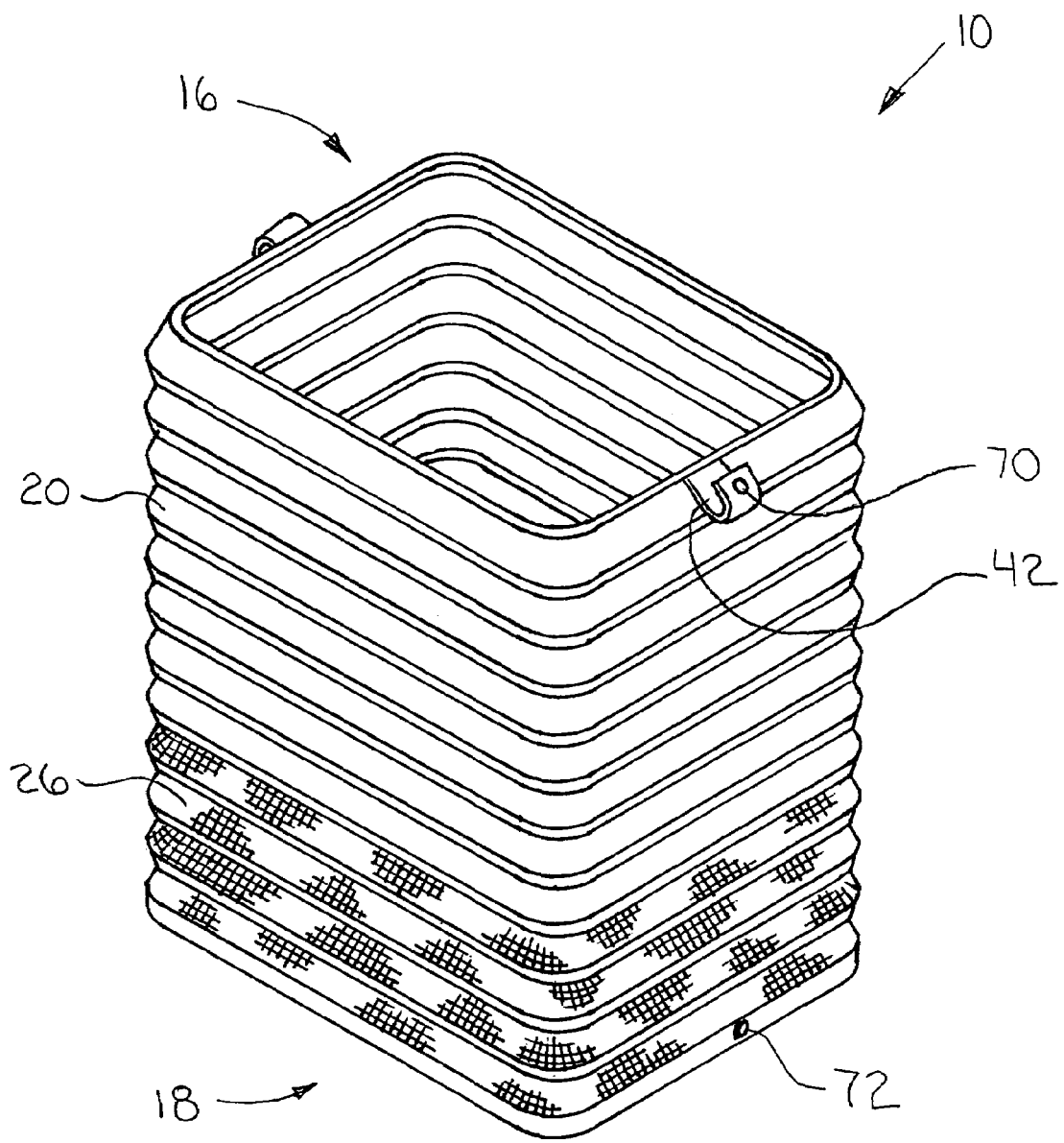
FIG. 9 is a perspective view of still yet another embodiment of the present invention pool filter cleaning device.

Still yet another embodiment of the present invention pool filter cleaning device is shown in FIG. 9. This embodiment, like the one shown in FIGS. 1-4 and the one shown in FIG. 6, also has a collapsible and expanded configuration. In this embodiment the containment chamber 12 is a bellows that is biased in the expanded configuration. The circumferential sidewall 14 of this embodiment has a rectangular shape with both the water deflecting portion 20 and the porous portion 26 being integral with the bellows. Although not seen in FIG. 9, the same contaminant trap shown in FIG. 4 is used, with a hook and loop strap material attached on the inside of the bellows to releasably secure the trap. The water deflecting flap, also not seen in FIG. 9, is attached to the inside of the bellows and extends generally downward toward the lower end of the containment chamber and overlaps the trap were it is attached to the hook and loop strap material attached to the bellows. Further, the securing strap 42 is provided with a female snap 70 that attaches to a male snap 72 that is attached to the lower end 18 of the containment chamber 12.

What has been described are preferred embodiments of a pool filter cleaning device in which modifications and changes may be made without departing from the spirit and scope of the accompanying claims. Although only certain embodiments have been described above in detail, those skilled in the art will appreciate that numerous modification are possible without materially departing from the novel teachings and advantages of the subject matter described herein. For example, although the containment chamber described above appears in a cylindrical and box shape having respectively a circular or rectangular cross section, it could have been differently shaped to provide a square, triangular, octagonal or any other cross-sectional shape. Accordingly, these and all other such modifications are intended to be included within the scope of the present invention. Other modifications, substitutions, changes, and omissions may be made in the design, operating conditions, and arrangement of the preferred and other exemplary embodiments without departing from the spirit of the present invention.

What is claimed is:

1. A pool filter cleaning device for capturing contaminants of a dirty pool filter, the pool filter cleaning device comprising:

a containment chamber having a upper end, a lower end, and a circumferential sidewall extending between the upper end and the lower end, the sidewall having a water deflecting portion adjacent the upper end, the containment chamber adapted for receiving the dirty pool filter through the upper end for cleaning, wherein the sidewall is formed from at least one flexible material, the containment chamber further comprising at least one coil spring in communication with the sidewall biasing the containment chamber to an expanded configuration, the coil spring having a top coil adjacent the upper end of the containment chamber and a bottom coil adjacent the lower end of the containment chamber;

a contaminant trap in communication with the sidewall for capturing the contaminants of the pool filter when water is delivered into the upper end of the cleaning device, the contaminant trap being sufficiently porous to allow water to pass through while substantially preventing diatomaceous earth from passing through; and wherein substantially all of the water delivered into the upper end of the cleaning device passes through the contaminant trap and out of the containment chamber.

2. The pool filter cleaning device of claim 1 further comprising at least one securing strap in communication with the upper end of the containment chamber for attachment to the lower end of the containment chamber for holding the cleaning device in a collapsed configuration.

3. A pool filter cleaning device for capturing contaminants of a dirty pool filter, the pool filter cleaning device comprising:

a containment chamber having a upper end, a lower end, and a circumferential sidewall extending between the upper end and the lower end, the sidewall having a water deflecting portion adjacent the upper end, the containment chamber adapted for receiving the dirty pool filter through the upper end for cleaning, containment chamber being a self supporting structure and is sufficiently porous at the lower end to allow water to pass through;

a contaminant trap in communication with the sidewall for capturing the contaminants of the pool filter when water is delivered into the upper end of the cleaning device, the contaminant trap being sufficiently porous to allow water to pass through while substantially preventing diatomaceous earth from passing through; and wherein substantially all of the water delivered into the upper end of the cleaning device passes through the contaminant trap and out of the containment chamber.

4. A pool filter cleaning device for capturing contaminants of a dirty pool filter, the pool filter cleaning device comprising:

a containment chamber having a upper end, a lower end, and a circumferential sidewall extending between the upper end and the lower end, the sidewall having a water deflecting portion adjacent the upper end, the containment chamber adapted for receiving the dirty pool filter through the upper end for cleaning, the containment chamber formed from at least one flexible material;

a bellows having a collapsed and expanded configuration, the bellows having an distal and proximal end, the proximal end being open and in communication with the upper end of the containment chamber, the distal end being sufficiently porous to allow water to pass through the bellows, the bellows providing support for the containment chamber and biasing the cleaning device in the expanded configuration;

a contaminant trap in communication with the sidewall for capturing the contaminants of the pool filter when water is delivered into the upper end of the cleaning device, the contaminant trap being sufficiently porous to allow water to pass through while substantially preventing diatomaceous earth from passing through; and wherein substantially all of the water delivered into the upper end of the cleaning device passes through the contaminant trap and out of the containment chamber.

5. A pool filter cleaning device for capturing contaminants of a dirty pool filter, the pool filter cleaning device having an expanded configuration for cleaning the dirty pool filter and a collapsible configuration for when the cleaning device is not in use, the cleaning device comprising:

a containment chamber having a upper end, a lower end, and a circumferential sidewall extending between the upper end and the lower end, the sidewall having a water deflecting portion adjacent the upper end, the containment chamber adapted for receiving the dirty pool filter through the upper end for cleaning;

a contaminant trap in communication with the sidewall for capturing the contaminants of the dirty pool filter when water is delivered into the upper end of the cleaning device, the contaminant trap being sufficiently porous to allow water to pass through while substantially preventing diatomaceous earth from passing through;

a means for expanding or collapsing the cleaning device between the expanded and the collapsed configurations; and, wherein substantially all of the water delivered into the upper end of the cleaning device passes through the contaminant trap and out of the containment chamber.

6. The pool filter cleaning device of claim 5 wherein the contaminant trap captures particles between a size range of about 30.0 μm and 40.0 μm with an efficiency of at least about 60%.

7. The cleaning device of claim 5 wherein:

the sidewall of the containment chamber further comprises a porous portion adjacent the water deflecting portion, the porous portion being sufficiently porous to allow water to pass through; and the contaminant trap is in communication with the water deflecting portion of the sidewall adjacent the porous portion; and, substantially all of the water delivered into the upper end of the cleaning device passes through the contaminant trap and out of the porous portion of the sidewall.

8. The cleaning device of claim 5 wherein the contaminant trap is in removable communication with the sidewall.

9. The cleaning device of claim 5 wherein the contaminant trap is disposable.

10. The cleaning device of claim 5 wherein the sidewall further comprises:

a water deflecting flap in communication with the water deflecting portion of the sidewall, the flap extending generally downward toward the lower end of the containment chamber, the flap overlapping the contaminant trap where the contaminant trap is in communication with the sidewall.

11. The cleaning device of claim 5 wherein the containment chamber further comprises a bottom shell in communication with the sidewall enclosing the containment chamber at the lower end, the bottom shell being sufficiently porous to allow water to pass through.

12. The cleaning device of claim 5 wherein the containment chamber further comprises a non-porous bottom shell in communication with the sidewall enclosing the containment chamber at the lower end.

13. The cleaning device of claim 5 wherein the containment chamber is open at the lower end.

14. The cleaning device of claim 5 wherein the means for expanding or collapsing the cleaning device comprises;
   at least one coil spring in communication with the sidewall, the coil spring biasing the containment chamber in the expanded configuration.

15. The cleaning device of claim 14 wherein the coil spring has a top coil adjacent the upper end of the containment chamber and a bottom coil adjacent the lower end of the containment chamber.

16. The cleaning device of claim 5 wherein the means for expanding or collapsing the cleaning device further comprises:
   a upper rim in communication with the upper end of the containment chamber for holding the upper end of the containment chamber in a first desired shape;
   a lower rim in communication with the lower end of the containment chamber for holding the lower end of the containment chamber in a second desired shape; and
   a plurality of flexible ribs in communication with the upper rim and lower rim configured to support the cleaning device in the expanded configuration.

17. The cleaning device of claim 16 wherein the plurality of flexible ribs are configured to bias the cleaning device in the expanded configuration.

18. The cleaning device of claim 17 further comprising at least one securing strap in communication with the upper end of the containment chamber for attachment to the lower end of the containment chamber for holding the cleaning device in the collapsed configuration.

19. The cleaning device of claim 5 wherein the means for expanding or collapsing the cleaning device comprises;
   an expandable and collapsible bellows having a distal and proximal end, the proximal end in communication with the upper end of the containment chamber and the distal end being sufficiently porous to allow water to pass through the bellows, the bellows providing support for the containment chamber and biasing the cleaning device in the expanded configuration.

* * * * *